(12) United States Patent
Barnett et al.

(10) Patent No.: US 12,532,810 B2
(45) Date of Patent: Jan. 27, 2026

(54) CONDITIONER ASSEMBLY WITH REMOTE ADJUSTABLE ROLL GAP

(71) Applicant: MacDon Industries Ltd., Winnipeg (CA)

(72) Inventors: Neil Barnett, Manitoba (CA); Matthew Stephens, Niverville (CA)

(73) Assignee: MacDon Industries Ltd., Winnipeg (CA)

(*) Notice: Subject to any disclaimer, the term of this patent is extended or adjusted under 35 U.S.C. 154(b) by 1032 days.

(21) Appl. No.: 17/590,956

(22) Filed: Feb. 2, 2022

(65) Prior Publication Data

US 2022/0240450 A1     Aug. 4, 2022

Related U.S. Application Data

(60) Provisional application No. 63/144,742, filed on Feb. 2, 2021.

(51) Int. Cl.
*A01D 82/02*     (2006.01)

(52) U.S. Cl.
CPC .................... *A01D 82/02* (2013.01)

(58) Field of Classification Search
CPC ............................. A01D 82/02; A01D 82/00
See application file for complete search history.

(56) References Cited

U.S. PATENT DOCUMENTS

| | | | | |
|---|---|---|---|---|
| 3,262,253 A * | 7/1966 | Halls | ....................... | A01D 82/00 56/DIG. 1 |
| 6,584,755 B2 * | 7/2003 | Holtkotte | ............. | A01D 43/085 56/60 |
| 8,056,311 B1 * | 11/2011 | Barnett | .................. | A01D 82/00 56/16.4 B |
| 8,166,736 B2 * | 5/2012 | Nickel | ................. | A01D 43/102 56/16.4 C |
| 2019/0029182 A1 * | 1/2019 | Glade | ..................... | F15B 1/033 |

FOREIGN PATENT DOCUMENTS

WO     WO-2017191022 A1 *  11/2017  ............. A01D 43/10

* cited by examiner

*Primary Examiner* — Joseph M Rocca
*Assistant Examiner* — Ashley A Kaercher
(74) *Attorney, Agent, or Firm* — Miller, Canfield, Paddock and Stone

(57) ABSTRACT

A conditioner assembly in an agricultural implement for conditioning cut crop material includes a top roll and a bottom roll rotatably supported by a pair of lateral side walls. The top roll is arranged relative to the bottom roll to define a roll gap therebetween for conditioning the cut crop material as the cut crop material passes therethrough. A stabilizing link extends between each of the lateral side walls and the top roll for pivotally coupling the top roll to the conditioner frame, and an adjustment mechanism extends between each of the lateral side walls and the top roll. The adjustment mechanism is selectively and remotely actuatable to automatically pivot the top roll toward and away from the bottom roll, thereby decreasing and increasing the roll gap for optimally conditioning different types and volumes of cut crop material received by the agricultural implement.

14 Claims, 8 Drawing Sheets

CONDITIONER ASSEMBLY WITH REMOTE ADJUSTABLE ROLL GAP

CROSS-REFERENCE TO RELATED APPLICATIONS

This application claims priority to and all the benefits of U.S. Provisional Application No. 63/144,742, filed on Feb. 2, 2021, the disclosure of which is hereby incorporated by reference in its entirety.

BACKGROUND OF THE INVENTION

1. Field of the Invention

The present invention relates to a conditioner assembly in an agricultural implement for conditioning cut crop material.

2. Description of Related Art

Conditioner assemblies in an agricultural implement for conditioning cut crop material are known in the art. Typical conditioner assemblies include a conditioner frame extending laterally between a pair of opposite side walls. A top roll and a bottom roll are rotatably supported between the side walls substantially parallel to each other for conditioning the cut crops as the crops pass between the top and bottom rolls. The bottom roll is typically fixed relative to the side walls of the conditioner frame, and the top roll is typically adjustable and moveable toward and away from the bottom roll to decrease and increase a roll gap between the top and bottom rolls for accommodating and optimally conditioning different crop properties and volumes. However, adjustment of the roll gap is typically a tool-based adjustment, and an operator is typically required to leave a cab of an agricultural vehicle to make the necessary or desired adjustments. Therefore, it is tedious and time-consuming to adjust the roll gap for each crop type or different crop volumes to optimally condition the crops.

SUMMARY OF THE INVENTION

According to one aspect of the invention, a conditioner assembly in an agricultural implement is provided for conditioning cut crop material. The conditioner assembly includes a conditioner frame having a pair of lateral side walls and a first roll rotatably supported by the lateral side walls. A second roll is rotatably supported by the lateral side walls substantially parallel to the first roll. The second roll extends between a pair of opposite ends and is arranged relative to the first roll to define a roll gap therebetween for conditioning the cut crop material as the cut crop material passes therethrough. A stabilizing link extends between at least one of the lateral side walls and one of the ends of the second roll for pivotally coupling the second roll to the conditioner frame. The conditioner assembly further includes an adjustment mechanism extending between at least one of the lateral side walls of the conditioner frame and one of the ends of the second roll. The adjustment mechanism automatically pivots the second roll toward and away from the first roll in response to selective remote actuation of the adjustment mechanism to vary the roll gap between the first and second roll for optimally conditioning different types and volumes of cut crop material received by the agricultural implement.

BRIEF DESCRIPTION OF THE DRAWINGS

Advantages of the present disclosure will be readily appreciated as the same becomes better understood by reference to the following detailed description when considered in connection with the accompanying drawings, wherein.

DETAILED DESCRIPTION OF THE EMBODIMENTS

Figure 1:
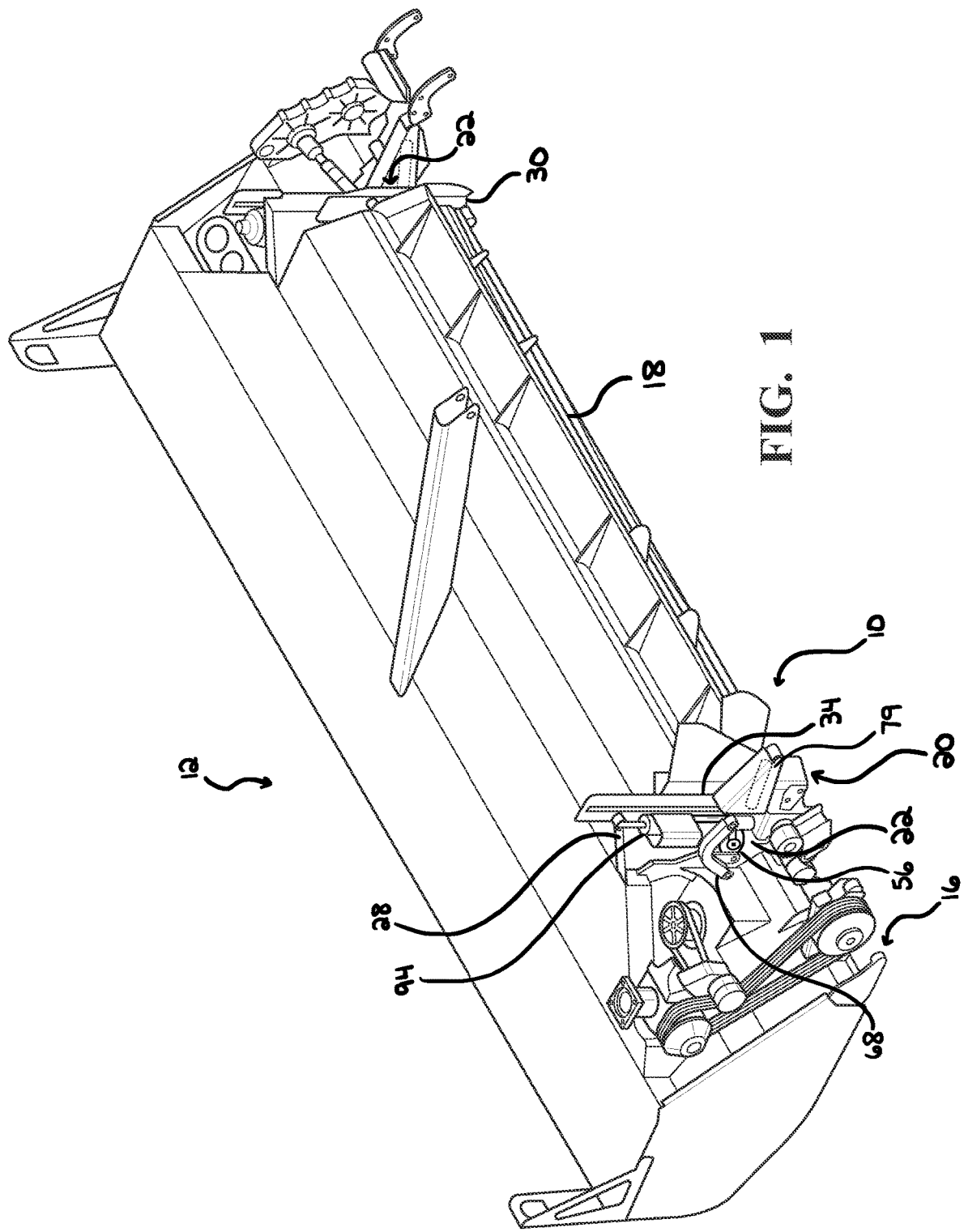
FIG. 1 is a perspective view of a harvesting implement with a conditioner assembly according to a primary embodiment of the present invention.
Figure 2:
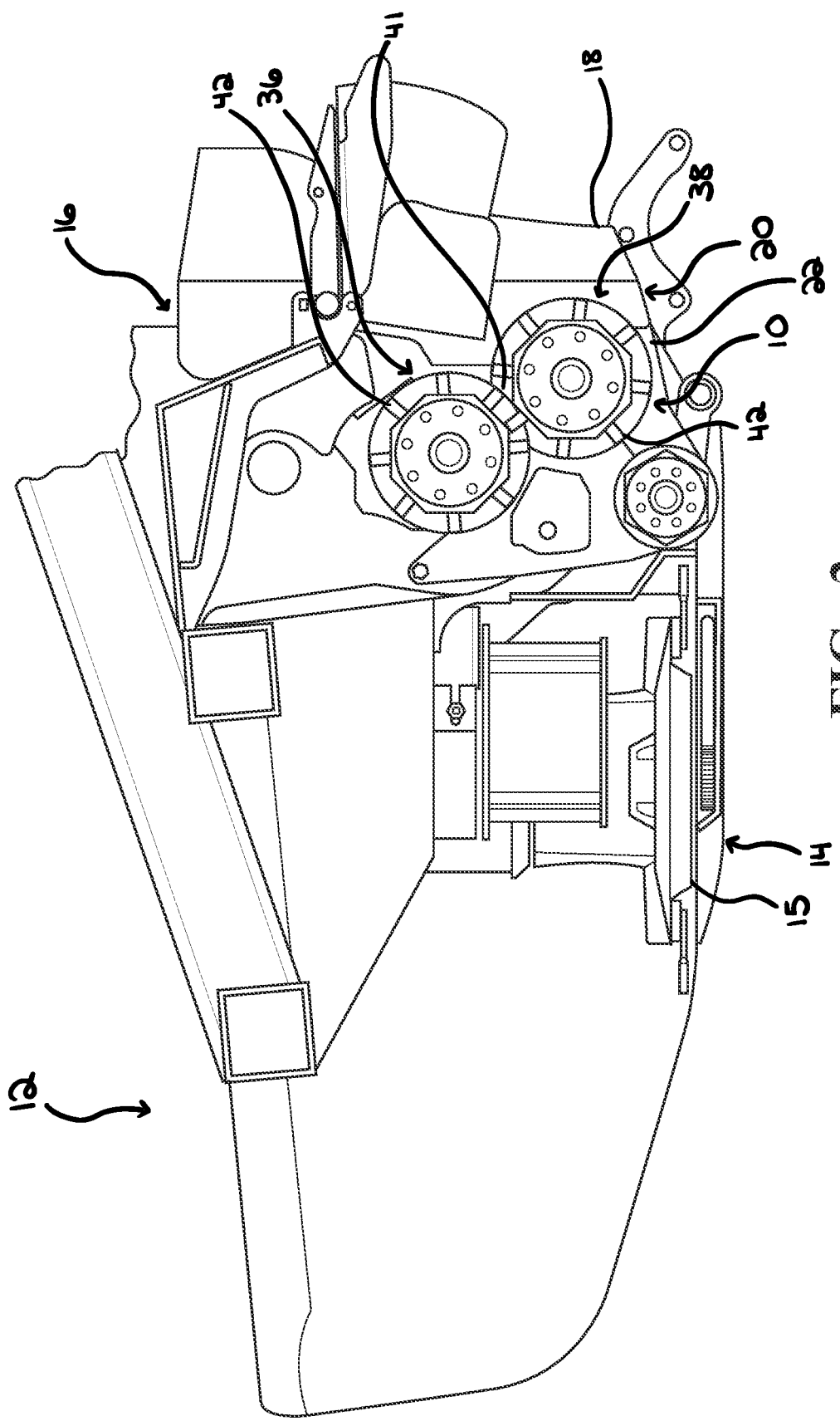
FIG. 2 is a fragmentary side view of the harvesting implement and the conditioner assembly of FIG. 1.
Figure 3:
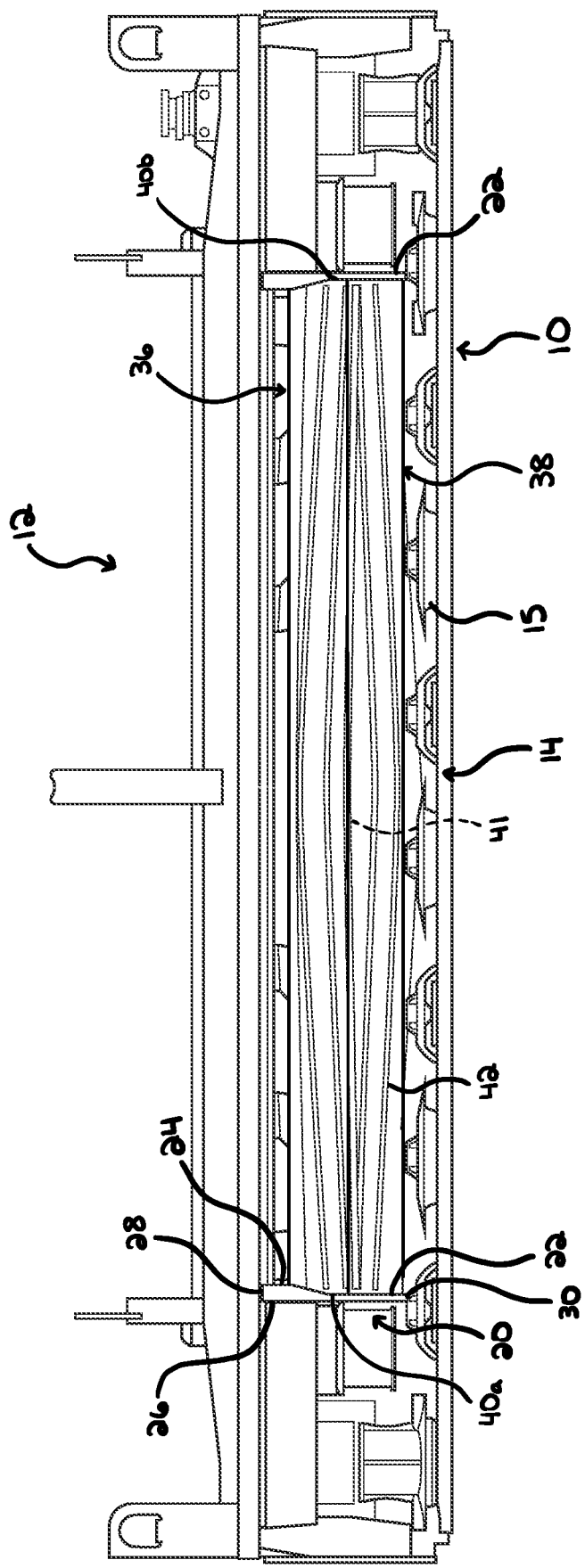
FIG. 3 is a fragmentary front view of the harvesting implement and the conditioner assembly of FIG. 1.

Referring to the Figures, wherein like numerals indicate like or corresponding parts throughout the several views, a conditioner assembly for conditioning cut crop material from a field is shown generally at 10. As shown in FIGS. 1-3, the conditioner assembly 10 is integrated within a harvesting implement 12, as is known in the art, wherein the harvesting implement 12 is adapted for cutting, conditioning, and depositing the crops back onto the field. The harvesting implement 12 is typically towed by a conventional agricultural vehicle, such as a tractor or a windrower, across the field containing the crops to be cut and conditioned. Referring to FIG. 2, the harvesting implement 12 includes a conventional cutting element, such as a cutter bar 14 having rotary cutting discs 15, for cutting the crops prior to conditioning by the conditioner assembly 10. The conditioner assembly 10 is arranged on a rear portion 16 of the harvesting implement 12 behind the cutter bar 14 and adjacent to a discharge opening 18 adapted for expelling the cut and conditioned crops back onto the field in a windrow or swath.

The conditioner assembly 10 includes a conditioner frame 20 extending laterally between a pair of opposite, substantially planar side walls 22 each having a medial face 24 and an opposite lateral face 26, as shown in FIG. 3. Referring to FIGS. 4-7, each side wall 22 includes a top portion 28 and a bottom portion 30 extending between a pair of front and rear edges 32, 34. A first, bottom roll 38 and a second, top roll 36, each extending longitudinally between a pair of opposite ends 40a, 40b, are rotatably supported between the medial faces 24 of the side walls 22 substantially parallel to each other for conditioning the cut crop material as the crops pass between the top and bottom rolls 36, 38. The bottom roll 38 is fixed relative to the side walls 22 of the conditioner frame 20, and the top roll 36 is moveable toward and away from the bottom roll 38 to decrease and increase a roll gap 41 defined as the radial space between the top and bottom rolls 36, 38 for accommodating and optimally conditioning different types of crops and crop volumes. Each top and bottom roll 36, 38 further includes a plurality of intermeshing flutes 42 extending helically therearound to crimp the stems of the cut crop material as the crops pass between the top and bottom rolls 36, 38, thereby helping to quickly and evenly dry the crops. The top and bottom rolls 36, 38 are contemplated to be any of a variety of suitable materials, including polyurethane or steel, depending on the type of crops to be conditioned. The top and bottom rolls 36, 38 may also substitute the flutes 42 for radially-extending fingers, as is known in the art, or may omit flutes 42 or fingers entirely, all without varying the scope of the invention.

Figure 4:
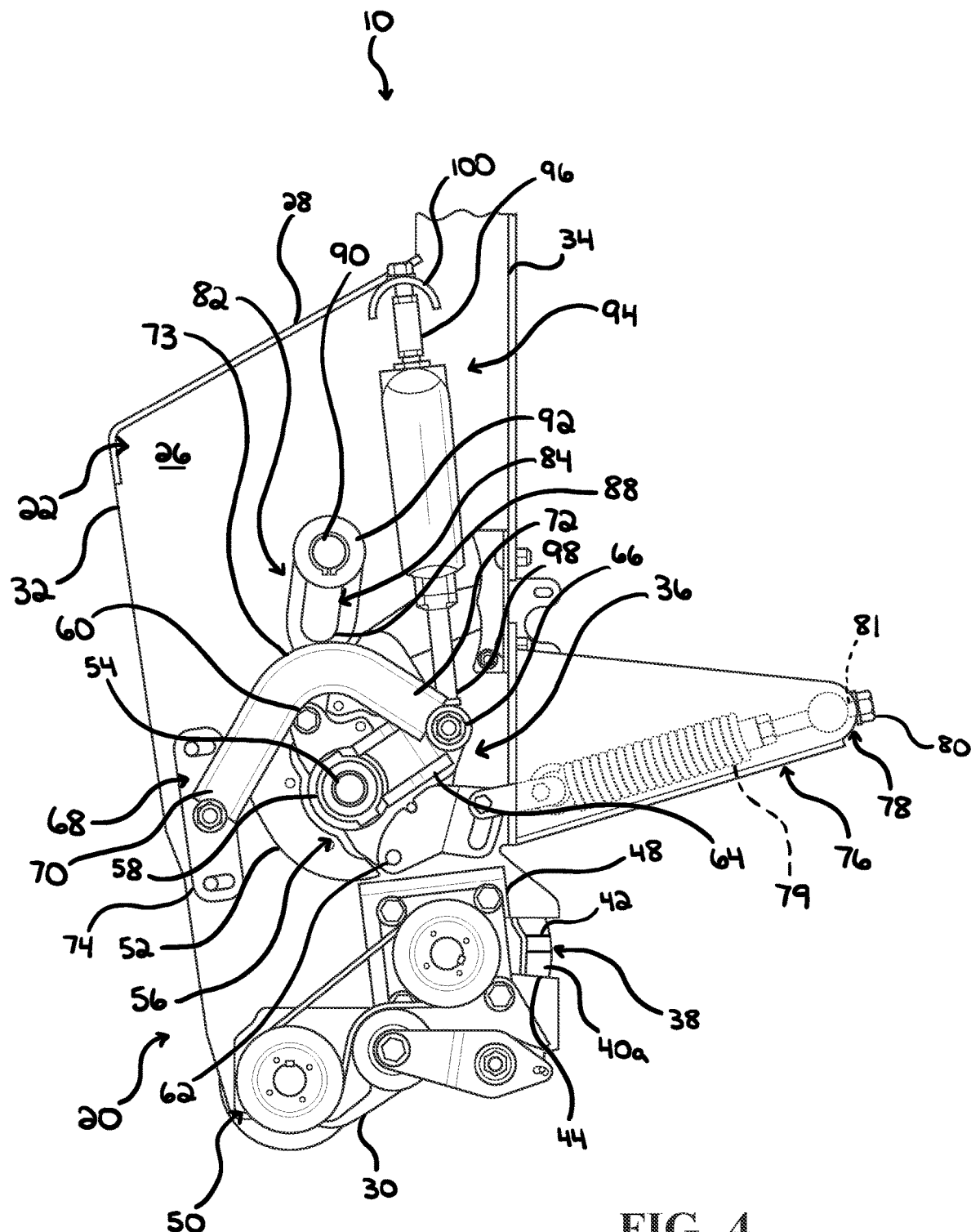
FIG. 4 is a fragmentary side view of the conditioner assembly of FIG. 1.
Figure 5:
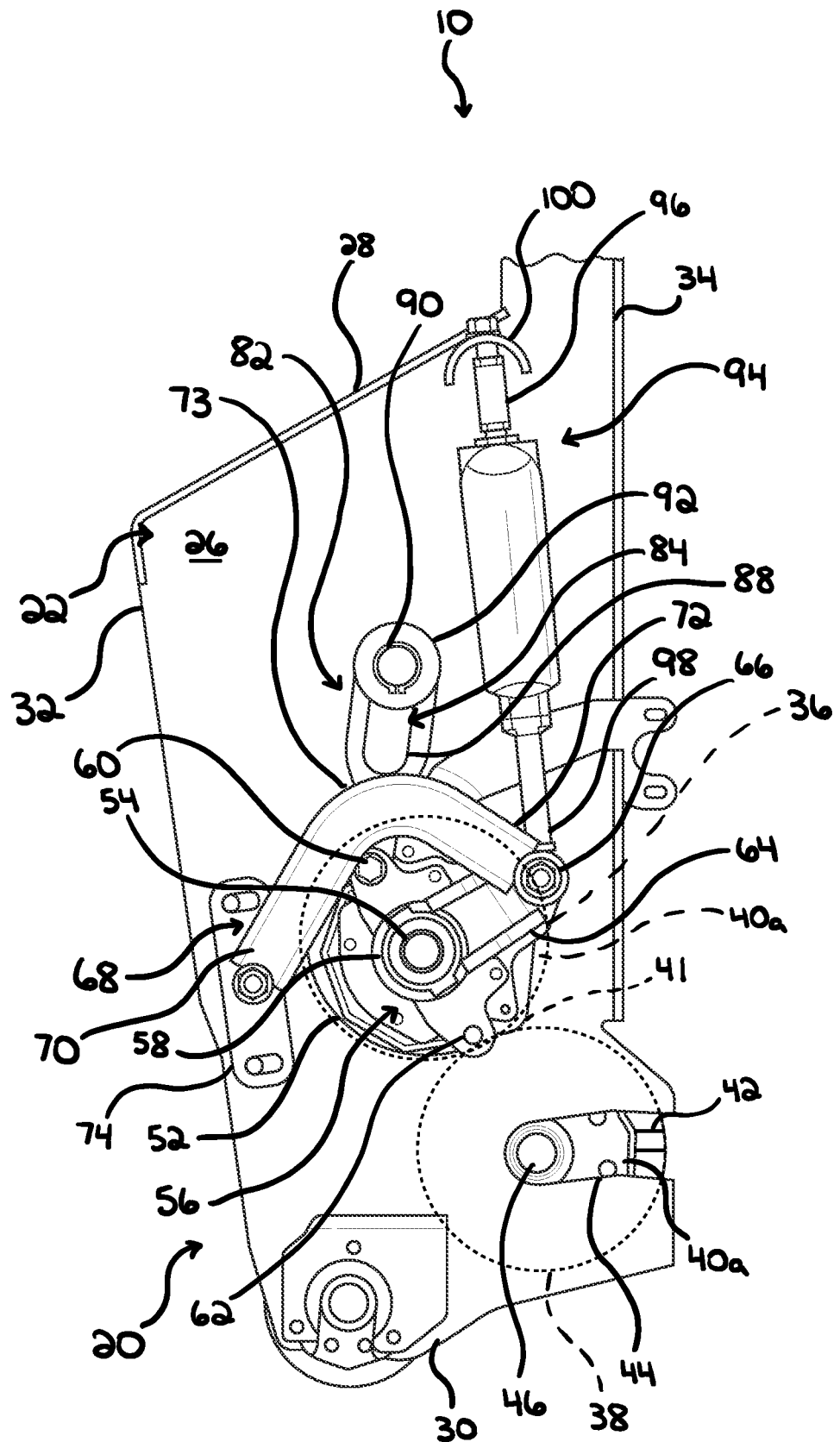
FIG. 5 is a fragmentary side view of the conditioner assembly of FIG. 1 showing a roll gap at a minimum roll gap setting.
Figure 6:
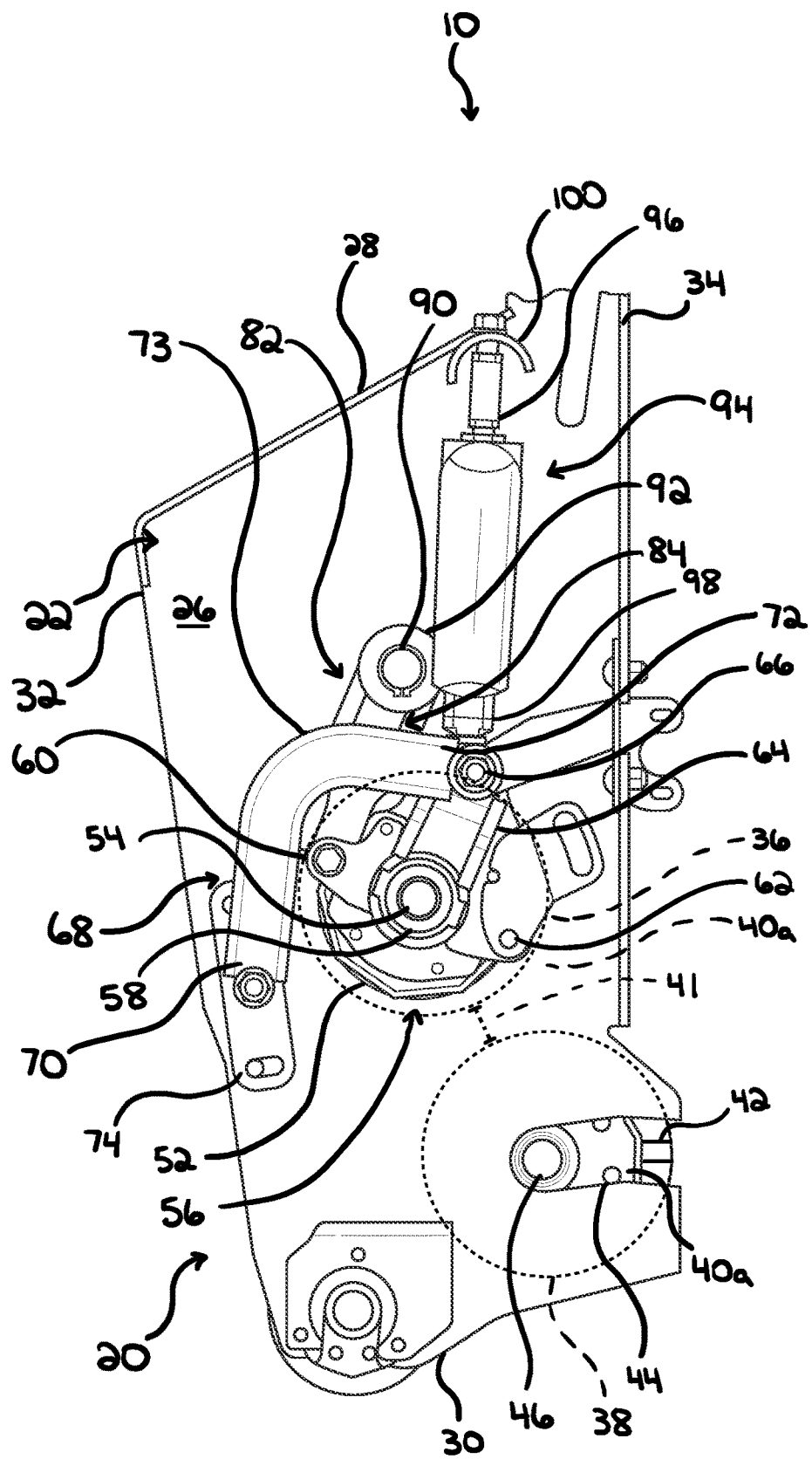
FIG. 6 is a fragmentary side view of the conditioner assembly of FIG. 1 showing the roll gap at a maximum roll gap setting.
Figure 7:
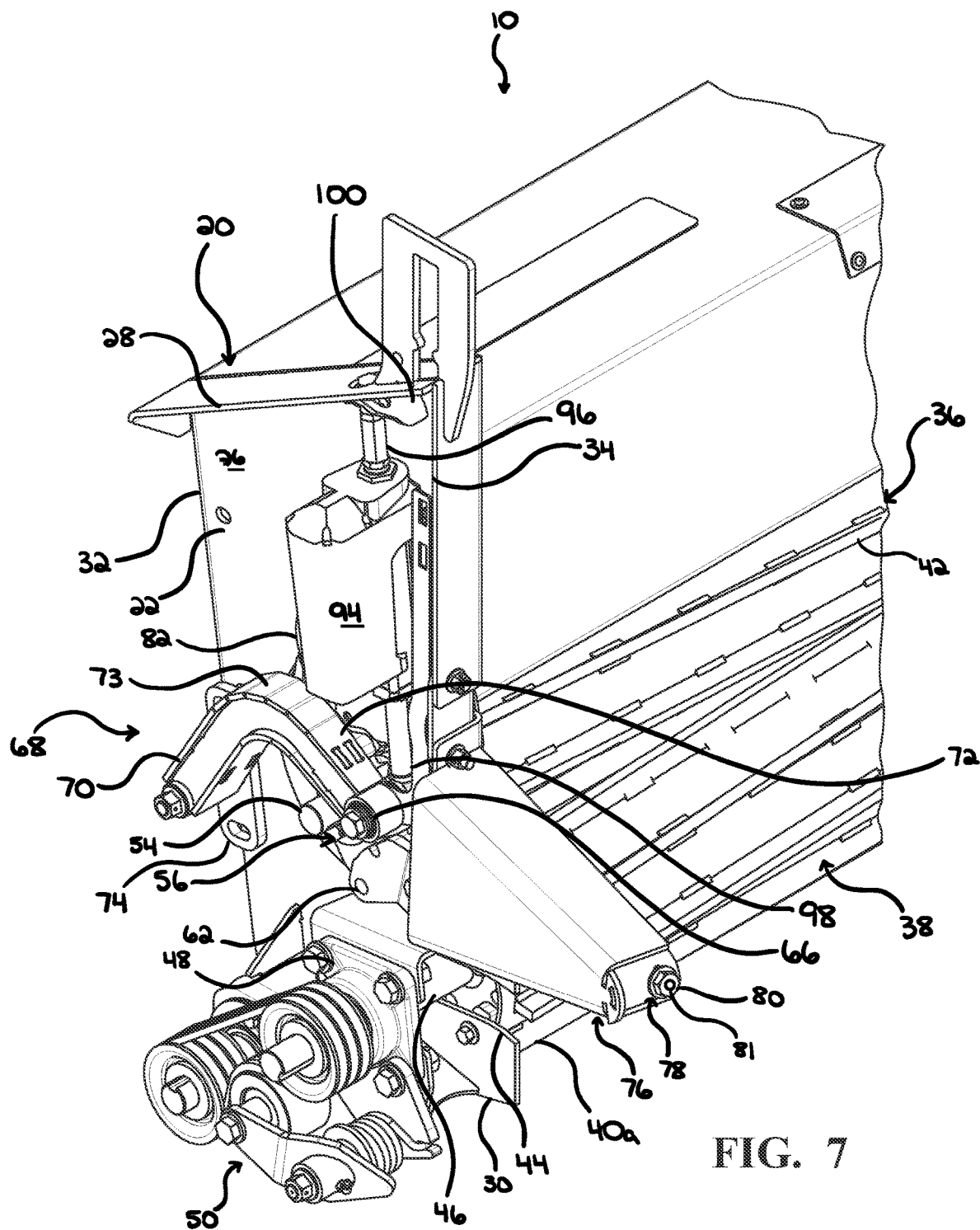
FIG. 7 is an enlarged fragmentary perspective view of the conditioner assembly of FIG. 1.

Referring to FIGS. 4-6, each end 40*a*, 40*b* of the bottom roll 38 is rotatably coupled to one of the side walls 22 of the conditioner frame 20 to rotatably support the bottom roll 38 therebetween. A slot 44 extends forwardly from the rear edge 34 of each the side walls 22 at the bottom portion 30 thereof, as shown in FIGS. 5 and 6. A shaft 46 extends axially from each end 40*a*, 40*b* of the bottom roll 38. Referring to FIGS. 4 and 7, the shafts 46 are received in the respective slots 44 and secured therein with bearing plates 48, thereby preventing movement of the bottom roll 38 relative to the side walls 22 and the top roll 36 while also allowing the bottom roll 38 to rotate. A conventional drive system, such as a pulley and belt system 50, is positioned adjacent to the lateral face 26 of at least one of the side walls 22 and is operatively coupled to at least one of the shafts 46 of the bottom roll 38 for rotatably driving the bottom roll 38 to condition the crops. However, it is to be appreciated that the top and bottom rolls 36, 38 may be rotatably driven by any other suitable mechanism known in the art without varying the scope of the invention.

Each end 40*a*, 40*b* of the top roll 36 is coupled to a respective one of the side walls 22 of the conditioner frame 20 to rotatably support the top roll 36 therebetween and allow movement of the top roll 36 relative to the bottom roll 38, thereby allowing adjustment of the roll gap 41 between a maximum roll gap setting and a minimum roll gap setting. Referring to FIGS. 5 and 6, an aperture 52 extending through each of the side walls 22 of the conditioner frame 20 is positioned above and forward of the slots 44 housing the shafts 46 of the bottom roll 38. A shaft 54 extends axially from each end 40*a*, 40*b* of the top roll 36 through the respective apertures 52, and each shaft 54 is rotatably coupled to an attachment bracket, shown generally at 56, for linking the top roll 36 to the conditioner frame 20 and various additional components of the conditioner assembly 10, as described in further detail below. Each attachment bracket 56 includes a central portion 58 for rotatably receiving the shaft 54, and the central portion 58 is flanked by a pair of first and second attachment portions 60, 62 extending radially therefrom and disposed adjacent to the lateral face 26 of the side wall 22. Each attachment bracket 56 further includes an attachment arm 64 extending radially from the central portion 58 of the attachment bracket 56 between the first and second attachment portions 60, 62 and terminating at an end pivot portion 66. In addition to extending radially from the central portion 58 of the attachment bracket 56, the attachment arm 64 further extends axially away from the top roll 36 such that the end pivot portion 66 is spaced laterally apart from the lateral face 26 of the side wall 22. When the roll gap 41 is at the minimum roll gap setting, as shown in FIG. 5, the end pivot portion 66 of the attachment arm 64 points generally toward the rear edge 34 of the side wall 22. Conversely, when the roll gap 41 is at the maximum roll gap setting, as shown in FIG. 6, the end pivot portion 66 of the attachment arm 64 points generally toward the top portion of the side wall 22.

Referring to FIGS. 4-6, an arcuate stabilizing link 68 operatively couples each attachment bracket 56 to the side walls 22 of the conditioner frame 20 and helps to provide consistent, stable motion as the top roll 36 is moved relative to the bottom roll 38. Each stabilizing link 68 includes a first link portion 70 and a second link portion 72 intersecting at a curved link corner 73. Each first link portion 70 is pivotally coupled to a link bracket 74 positioned on the respective side wall 22 generally between the aperture 52 and the front edge 32. Each second link portion 72 is pivotally coupled to the end pivot portion 66 of the attachment bracket 56. Thus, the stabilizing links 68 are positioned adjacent to the lateral face 26 of the respective side wall 22 and are arranged such that the link corners 73 are disposed generally above the apertures 52. The stabilizing links 68 are normally prevented from moving during operation of the conditioner assembly 10 to retain the top roll 36 at a previously selected position relative to the bottom roll 38, as described in further detail below. However, the stabilizing links 68 are also adapted to allow simultaneous pivoting at both the link bracket 74 and the end pivot portion 66 of the attachment bracket 56 when the top roll 36 is moved toward and away from the bottom roll 38 to decrease and increase the roll gap 41 between the top and bottom rolls 36, 38.

The top roll 36 is biased downwardly toward the bottom roll 38 for applying force on the crops as the crops pass over the bottom roll 38, thereby conditioning the crops. Biasing the top roll 36 further allows the top roll 36 to automatically move back toward the bottom roll 38 to the previously selected roll gap setting in the event that the roll gap 41 is temporarily increased due to crop flow variations or a foreign object passing between the top and bottom rolls 36, 38. Referring to FIG. 4, the conditioner assembly 10 includes a spring attachment bracket 76 coupled to the rear edge 34 of each side wall 22 substantially equidistant between the top and bottom portions 28, 30 thereof. Each spring attachment bracket 76 extends substantially perpendicularly from the respective rear edges 34 of the side walls 22 and terminates at a spring attachment point 78. A tensioning member, such as a coil spring 79, extends between the second attachment portion 62 of each attachment bracket 56 and the respective spring attachment point 78 for biasing the top roll 36 toward the bottom roll 38. The tension of the coil spring 79 can also be adjusted in a convention manner, such as with a nut 80 and a threaded post 81, as shown in FIG. 4, to vary pressure exerted on the crops by the top roll 36.

Referring to FIGS. 4-6, the conditioner assembly 10 further includes a roll stop element 82 coupled between each side wall 22 of the conditioner frame 20 and the respective attachment bracket 56 for supporting the top roll 36 and helping position and suspend the attachment brackets 56 within the apertures 52. The roll stop elements 82 are also adapted for taking or absorbing a majority of the force generated when the top roll 36 moves back toward the bottom roll 38 after the roll gap 41 is increased due to crop flow variations or foreign objects, as is explained above.

Figure 8:
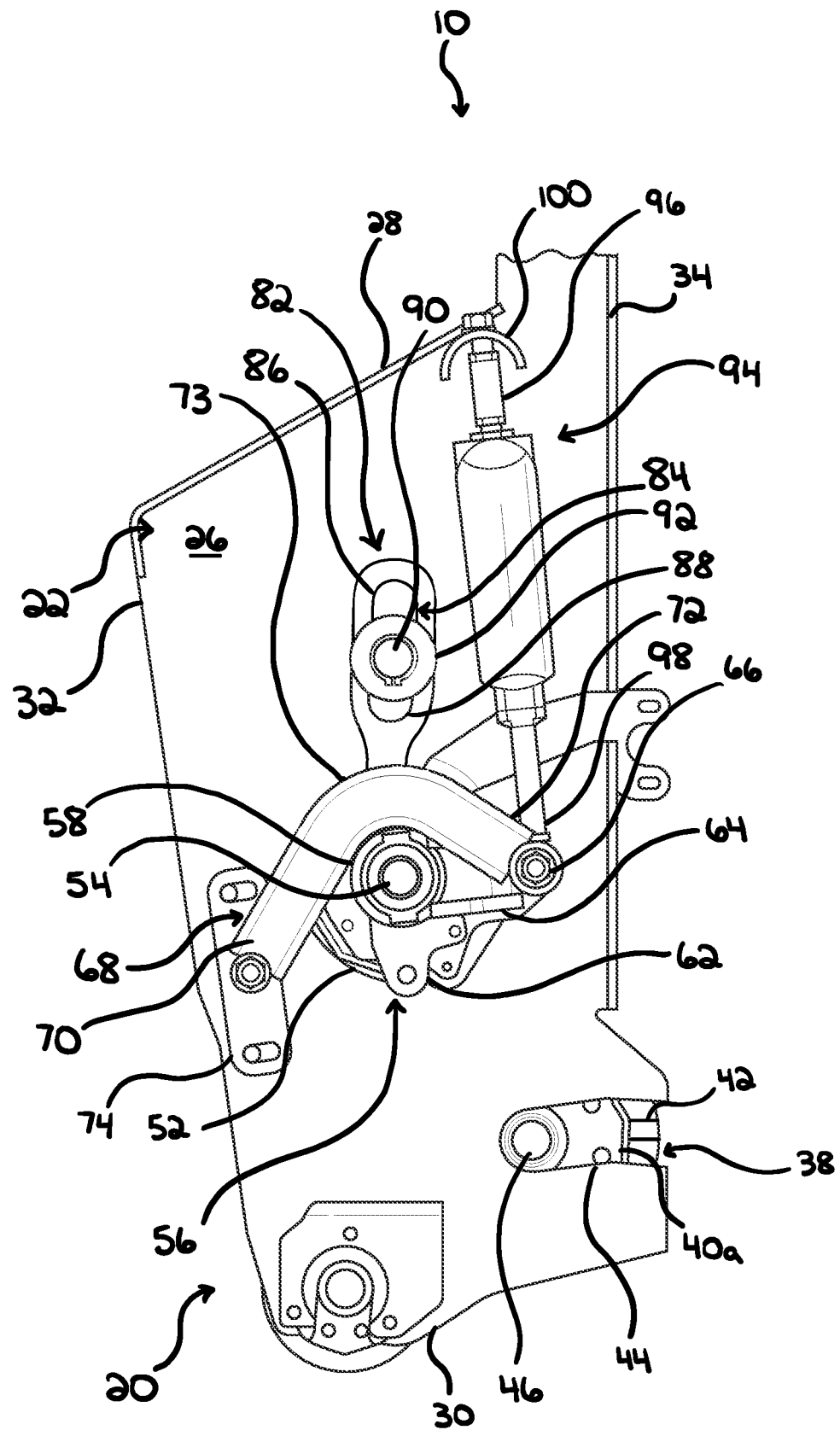
FIG. 8 is a fragmentary side view of the conditioner assembly of FIG. 1 showing the top roll pushed upwardly due to crop flow variations or foreign objects passing between the top and bottom rolls.

Each roll stop element 82 is pivotally coupled to the first attachment portion 60 of the respective attachment bracket 56 and includes an elongated slot 84 extending between an upper end 86 and an opposite lower end 88. A post 90 with a flanged end 92 extends from the lateral face 26 of each side wall 22 above the aperture 52 and is received by the slot 84 in the respective roll stop element 82. Referring to FIGS. 5 and 6, the roll stop element 82 pivots at the attachment bracket 56 to accommodate positioning and support of the top roll 36 when the roll gap 41 is at both the minimum roll gap setting and the maximum roll gap setting. The posts 90 are typically engaged with the upper ends 86 of the slots 84 during operation of the conditioner assembly 10 to help support the top roll 36 and position the attachment brackets 56 within the apertures 52. When the top roll 36 is pushed upwardly due to crop flow variations or foreign objects passing between the top and bottom rolls 36, 38, each roll stop element 82 is correspondingly raised relative to the posts 90 such that the posts 90 are instead positioned adjacent to the lower ends 88 of the slots 84 and are no longer supporting the weight of the top roll 36, as shown in FIG. 8. After the increased crop flow or foreign object has passed between the top and bottom rolls 36, 38 and exited the conditioner assembly 10, the top roll 36 lowers to the previously selected roll gap setting. Each roll stop element 82 correspondingly lowers relative to the posts 90 such that the upper ends 86 of the slots 84 again engage the posts 90 to stop lowering the top roll 36 at the selected roll gap setting and again suspend the attachment brackets 56 within the respective apertures 52. Therefore, the roll stop elements 82 are adapted and arranged to take the majority of the force generated by lowering of the top roll 36 in place of other components of the conditioner assembly 10 (such as an adjustment mechanism 94, described in the preceding paragraphs).

Referring to FIGS. 4-7, the adjustment mechanism 94 is operatively coupled to each respective attachment bracket 56 for automatically and remotely adjusting the roll gap 41 in response to actuation of the adjustment mechanism 94 and helping maintain the previously selected roll gap setting. The adjustment mechanism 94 as shown in the Figures and described herein is a hydraulic cylinder positioned adjacent each side wall 22 of the conditioner frame 20, wherein the hydraulic cylinders can correspondingly extend and retract linearly to simultaneously adjust both ends 40a, 40b of the top roll 36. However, it is to be appreciated that the adjustment mechanism 94 can alternatively employ any other suitable actuation method without varying the scope of the invention. Furthermore, the conditioner assembly 10 may omit one of the adjustment mechanisms 94 such that only a single adjustment mechanism 94 is used to adjust both ends 40a, 40b of the top roll 36, again without varying the scope of the invention.

Each adjustment mechanism 94 extends between a first end 96 and an opposite second end 98. The first end 96 of each adjustment mechanism 94 is operatively coupled to an arcuate-shaped bracket 100 positioned adjacent the top portion 28 of the respective side walls 22, and the second end 98 of each adjustment mechanism 94 is pivotally coupled to the end pivot portion 66 of the respective attachment bracket 56 adjacent to the stabilizing link 68. Referring to FIGS. 5 and 6, the adjustment mechanisms 94 are coupled to the arcuate brackets 100 such that each adjustment mechanism 94 is able to pivot forwardly and rearwardly relative to the side walls 22 of the conditioner frame 20. The adjustment mechanisms 94 simultaneously extend and retract to downwardly and upwardly move the end pivot portions 66 of the attachment brackets 56, thereby correspondingly pivoting the stabilizing links 68 and moving the top roll 36 to remotely set the roll gap 41. The roll gap 41 can therefore be automatically and remotely set to the desired roll gap setting without tools or mechanical adjustment, for example, by an operator in a cab of the agricultural vehicle.

In operation, actuating the adjustment mechanism 94 to linearly retract the adjustment mechanisms 94 pivots the stabilizing links 68 at the link brackets 74 in a first direction (counterclockwise when viewed from FIGS. 5 and 6) to move the end pivot portions 66 of the attachment brackets 56 upwardly relative to the side walls 22 of the conditioner frame 20, therefore correspondingly moving the top roll 36 away from the bottom roll 38 to position the roll gap 41 at the maximum setting, as shown in FIG. 6. Conversely, actuating the adjustment mechanism 94 to linearly extend the adjustment mechanisms 94 pivots the stabilizing links 68 at the link brackets 74 in a second direction (clockwise when viewed from FIGS. 5 and 6) to move the end pivot portions 66 of the attachment brackets 56 downwardly relative to the side walls 22 of the conditioner frame 20, therefore correspondingly moving the top roll 36 toward the bottom roll 38 to position the roll gap 41 at the minimum setting, as shown in FIG. 5.

The invention has been described in an illustrative manner, and it is to be understood that the terminology which has been used is intended to be in the nature of words of description rather than of limitation. Directional references employed or shown in the description, figures or claims, such as top, bottom, upper, lower, upward, downward, lengthwise, widthwise, longitudinal, lateral, and the like, are relative terms employed for ease of description and are not intended to limit the scope of the invention in any respect. Many modifications and variations of the present invention are possible in light of the above teachings. It is, therefore, to be understood that within the scope of the appended claims, the invention may be practiced other than as specifically described.

What is claimed is:

1. A conditioner assembly in an agricultural implement for conditioning cut crop material, the conditioner assembly comprising:
    a conditioner frame having a pair of lateral side walls;
    a first roll rotatably supported by the lateral side walls;
    a second roll arranged substantially parallel to the first roll, the second roll extending between a pair of opposite ends and arranged relative to the first roll to define a roll gap therebetween for conditioning the cut crop material as the cut crop material passes therethrough;
    a stabilizing link extending between at least one of the lateral side walls and at least one of the ends of the second roll for pivotally coupling the second roll to the conditioner frame;
    an adjustment mechanism extending between at least one of the lateral side walls of the conditioner frame and at least one of the ends of the second roll for automatically pivoting the second roll relative to the first roll in response to selective remote actuation of the adjustment mechanism to vary the roll gap between the first and second roll for optimally conditioning different types and volumes of cut crop material received by the agricultural implement;
    an attachment bracket pivotably coupled to the adjustment mechanism and the stabilizing link and rotatably supporting at least one of the ends of the second roll; and
    a roll stop element operatively coupled between at least one of the lateral side walls of the conditioner frame and at least one of the ends of the second roll;
    wherein actuation of the adjustment mechanism causes the adjustment mechanism to extend and retract linearly, and wherein extension of the adjustment mechanism pivots the second roll toward the first roll to decrease the roll gap and retraction of the adjustment mechanism pivots the second roll away from the first roll to increase the roll gap; and
    wherein the roll stop element is adapted and arranged for absorbing force generated when the second roll moves back toward the first roll following temporary increases in the roll gap due to increased amounts of cut crop material and foreign objects passing between the first roll and the second roll.

2. The conditioner assembly of claim 1 further comprising an aperture extending though each of the lateral side walls, wherein at least a portion of each end of the second roll extends through the respective aperture for allowing the second roll to pivot relative to the first roll and for coupling of the second roll with the at least one adjustment mechanism and the at least one stabilizing link.

3. The conditioner assembly of claim 2 further comprising a tensioning member operatively coupled between at least one of the ends of the second roll and the conditioner frame for applying a tension force on the second roll toward the first roll.

4. The conditioner assembly of claim 3 wherein the attachment bracket is operatively coupled to the at least one roll stop element.

5. The conditioner assembly of claim 4 wherein the at least one attachment bracket includes an attachment arm for operatively coupling with the at least one adjustment mechanism and the at least one stabilizing link, and wherein the at least one attachment bracket includes a first attachment portion positioned adjacent to the attachment arm for operatively coupling with the at least one roll stop element.

6. The conditioner assembly of claim 5 wherein the at least one attachment bracket includes a second attachment portion opposite the first attachment portion for coupling the tensioning member to the second roll.

7. The conditioner assembly of claim 6 wherein each lateral side wall includes a lateral face and an opposite medial face extending between a top portion and a bottom portion with a pair of front and rear edges, and wherein the at least one adjustment mechanism, the at least one stabilizing link, and the at least one roll stop element are each coupled to the conditioner assembly adjacent to at least one of the lateral faces of the lateral side wall.

8. The conditioner assembly of claim 7 wherein the at least one stabilizing link includes a first link portion and a second link portion intersecting at a curved link corner, the first link portion pivotally coupled to the attachment arm of the at least one attachment bracket and the second link portion coupled to the respective lateral side wall adjacent the front edge thereof.

9. The conditioner assembly of claim 8 wherein the at least one adjustment mechanism includes a hydraulic cylinder.

10. The conditioner assembly of claim 9 wherein the hydraulic cylinder extends between a first end operatively coupled to the respective lateral side wall adjacent the top portion thereof and a second end operatively coupled to the attachment arm of the at least one attachment bracket.

11. The conditioner assembly of claim 10 further including a post extending from at least one of the lateral side walls of the conditioner frame.

12. The conditioner assembly of claim 11 wherein the roll stop element includes an elongated slot with an upper end and an opposite lower end, the post extending through the slot such that engagement of the post with the upper end of the slot at least partially supports the second roll.

13. The conditioner assembly of claim 12 further comprising a drive system operatively coupled to at least one of the first and second rolls for operatively driving the first and second rolls to condition the cut crop material.

14. The conditioner assembly of claim 13 wherein the second roll is positioned above the first roll.

* * * * *